Nov. 29, 1960
W. E. RUDISCH
2,962,141
CLUTCH
Filed April 25, 1958
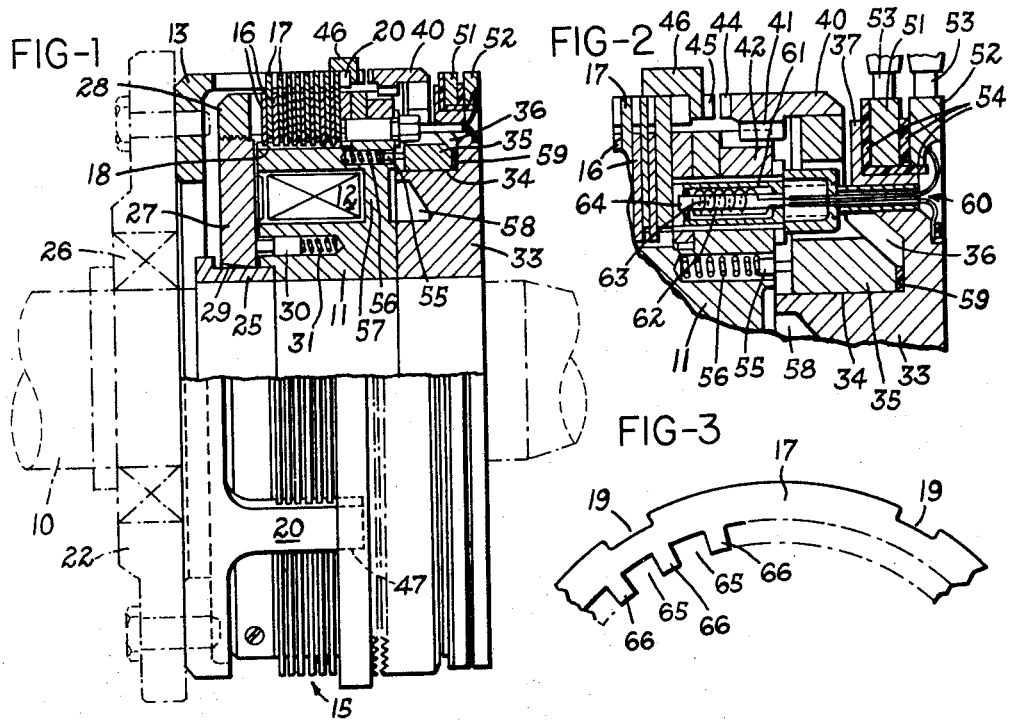
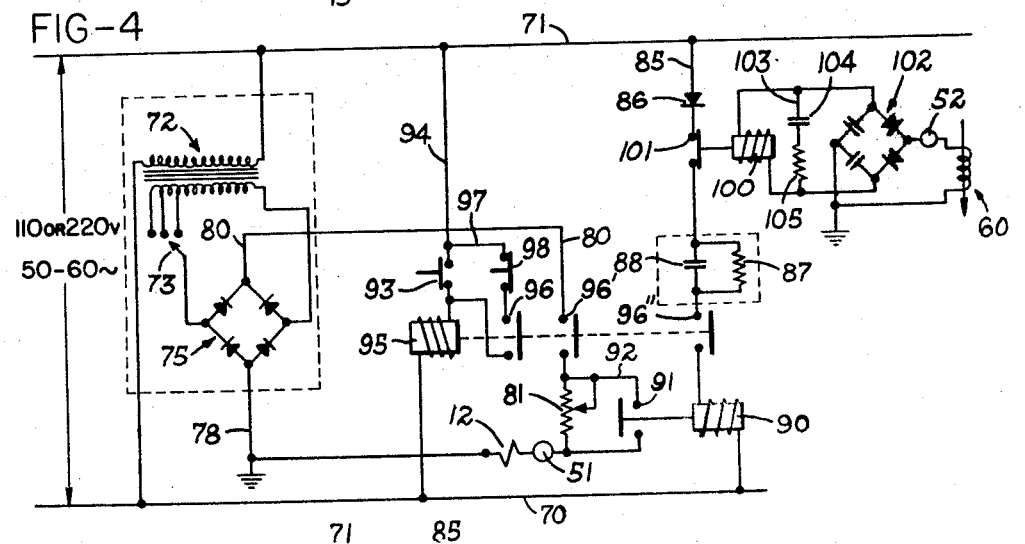
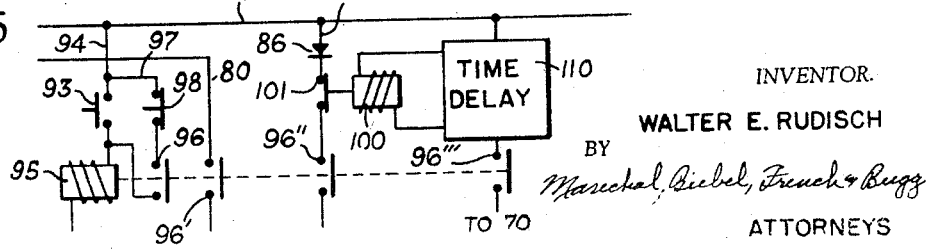
INVENTOR.
WALTER E. RUDISCH
BY
Marechal, Biebel, French & Bugg
ATTORNEYS

United States Patent Office 2,962,141
Patented Nov. 29, 1960

2,962,141

CLUTCH

Walter E. Rudisch, Dayton, Ohio, assignor, by mesne assignments, to The Bendix Corporation, a corporation of Delaware Filed Apr. 25, 1958, Ser. No. 730,929

9 Claims. (Cl. 192—53)

This invention relates to clutches, and more particularly to an electromagnetic clutch capable of transmitting high torque loads.

Clutches for machine tool applications should be able to transmit high torque loads incident to work operations on the work piece held by the chuck. Tooth or dog type clutches, in which connection between the driving and driven parts is effected through mating teeth, are normally capable of transmitting the high torque loads desired, but they are not without some drawback in that comparatively large stresses may be placed on the teeth if the clutch is engaged while there is a substantial difference in rotational speeds between the mating parts. On the other hand, clutches using frictional connections such as an intermeshed friction disk stack, can be used, but they are less able to transmit the torque necessary or desired in a particular operation due to slippage between the disks.

It is an object of this invention to provide a clutch which embodies both friction elements and positively intermeshing clutch members, wherein the friction elements are arranged to effect the initial connection between the driving and driven parts to bring the parts into approximate synchronism before the positive clutch connection is effected.

It is another object of this invention to provide an electromagnetic clutch having both frictional and positive clutching connections in which the connections are effected in desired sequence through use of different flux densities to initiate sequential actuation of the two clutches.

Another object of this invention is to provide an electromagnetic clutch as outlined above wherein the positive clutch connection is initiated by use of a higher flux density than that required to engage the frictional clutching members.

It is a further object of this invention to provide an improved clutch including frictional and positive clutch members actuated by a single electromagnet, wherein sequenced control of the two clutch members is provided by a control circuit supplying different operating potentials to the electromagnet.

It is an additional object of this invention to provide a control wherein the change in applied potential is effected in accordance with relative rotation between the clutch bodies.

Other objects and advantages of this invention will be apparent from the following description, the accompanying drawings and the appended claims.

In the drawings:

Fig. 1 is a side view partly in section and partly in elevation showing an electromagnetic clutch according to the present invention;

Fig. 2 is a somewhat enlarged fragmentary view showing the positive connection means and the magnetic pick up for interrupting the application of the high voltage to the armature;

Fig. 3 is a fragmentary elevation of a portion of the friction disk adjacent the end of the magnetic pick up;

Fig. 4 is a wiring diagram; and

Fig. 5 is a wiring diagram of a modified control circuit.

Referring to Fig. 1 of the drawing, which illustrates a preferred embodiment of the present invention, a driving shaft 10 extends from a suitable source of power. The driving shaft 10 receives a central driving member or body 11 which includes the energizing coil 12 and can be drivingly connected to a driven outer body member or spider 13 through both frictional and positive clutch connections. A friction disk stack 15, which is made up of a plurality of inner disks 16 and outer disks 17, provides the frictional connection of the clutch. The inner disks 16 are mounted on the outer shoulder 18 of body 11, which shoulder can be serrated or otherwise similarly shaped to form a splined connection with the inner edges of the disks providing for limited axial movement of the disks without any relative circumferential movement. The outer disks 17 are recessed at 19 along the outer edges thereof, as shown in Fig. 3, to receive the angularly spaced axially extending fingers 20 of the spider 13. Thus both the inner and outer disks are fixed on their respective clutch members against relative rotational movement but both are permitted a limited amount of axial movement so that the interengaging stack of disks 16 and 17 can be tightened to form the frictional connection between bodies 11 and 13. The outer body 13 can be connected to any desired driven member, here shown as a gear 22.

Also mounted for rotation with driving shaft 10 is a spacer sleeve 25 which is held in axial position on the shaft by the body 11 and the bearing 26 of gear 22, the sleeve 25 having a first armature plate 27 mounted thereon for axial movement. The armature plate 27 includes an adjustable pressure ring 28 threaded on its outer edge surface to abut against the end of disk stack 15 and has its inner surface 29 tapered slightly, as shown, to reduce or eliminate the possibility of the armature becoming stuck during axial movement. The armature plate 27 and pressure ring 28 are responsible for creating mechanical pressure against the stack 15 when the coil 12 is energized to form the frictional connection between the bodies, and the adjustable connection between the main body of the plate 27 and the pressure ring 28 enables compensation for lessened disk thickness resulting from wear after a period of use. The plungers 30 and associated springs 31 in the body 11 serve to maintain the armature plate 27 and its associated parts in the non-operating position to disengage the disk stack 15 when the coil 12 is deenergized.

A carrier 33 is located on the opposite side of driving body 11 from armature plate 27 and is bolted or otherwise positively connected to the body 11 for rotary movement therewith. The carrier 33 has an axially extending circumferential surface 34 formed thereon adjacent the driving body 11 to receive a second armature 35. The armature 35 fits within a recess 36 between driving body 11 and an upstanding wall 37 on carrier 33 for limited axial movement between these two members.

The armature 35 carries on its outer periphery a spline ring 40 which includes a plurality of teeth 41 extending radially inwardly toward the axis of driving shaft 10 for engagement with a gear or spline ring 42 which is secured to driving body 11 and has outwardly extending teeth for mating with the teeth of spline ring 40. This spline connection between armature 35 and driving body 11 permits axial movement of armature 35 toward and away from spider 13 and provides a direct, positive connection between the armature 35 and the driving body 11 at all times. Therefore, the body 11 and armature 35 will rotate at the same angular velocity, that speed being identical with the rotational velocity of driving shaft 10.

The spline ring 40 also includes a plurality of axially extending driving teeth 44 on its end surface facing the spider 12. These teeth 44 mate with similar teeth 45 formed on a ring member 46 which is slotted at 47 for drivingly receiving the ends of the fingers 20 of spider body 13. The teeth 44 and 45 thus can mesh to form a positive driving connection between the driving body 11, carrier 33, armature 35, spline ring 40, ring member 46, the driven member or spider 13 and associated driven device so that substantial torque loads can be transmitted continuously through the clutch.

The clutch of the present invention is designed to effect the initial connection between the driving and driven parts through the friction disk stack 15, as previously described, and later to complete the driving through the positive connection afforded by mating teeth 44 and 45. These sequenced connections are made by first drawing armature 27 against the disk stack 15 to create the frictional connection, and then at a later time drawing the second armature 35 toward body 11 to connect the teeth 44 and 45, with these sequential operations being effected by controlling the voltage applied to energize the coil 12 as now described.

Application of electrical current to coil 12 is effected through suitable connection to one of the slip rings 51, 52 which are mounted within an appropriately formed recess on wall 37 of carrier 33, current being supplied to the slip rings through the usual type of brushes 53. Insulating material 54 separates the slip rings 52 from each other and from the carrier 33 to prevent shorting of the electrical circuit. The magnetic field created by coil 12 is responsible for drawing both of the armatures toward driving body 11, although the armature 35 will be attracted only by a field of higher flux density than is necessary for attraction of armature 27, due partially to the fact that armature 27 is located somewhat closer to coil 12 than is armature 35.

A higher flux density requirement for activation of armature 35 is further achieved by biasing the armature away from body 11 by means of plungers 55 and associated springs 56 which are of greater strength than their corresponding plunger and spring members 30 and 31 which urge armature 27 outwardly from body 11. The plungers 55 and springs 56 are also strong enough to prevent accidental engagement between teeth 44 and 45 and insure instantaneous disengagement of the teeth upon deenergization of coil 12. Thus a relatively smaller magnetic flux field will serve to activate the armature 27 while having no similar effect on armature 35, the application of a higher current to coil 12 with consequent increase in the magnetic flux density being required to draw second armature 35 toward the body 11 for engagement of mating teeth 44 and 45 to form the positive driving connection, although the relatively smaller field is sufficient to hold armature 35 in the engaged position.

The clutch construction as shown provides for directing the field along designated flux paths, to insure proper operation of armatures 27 and 35 as already explained. As best shown in Fig. 1, body 11 has a recess in the face opposite armature 27 forming a bridge of material 57 which is capable of transmitting all of the flux emanating from coil 11 when it is energized to produce the lower flux density. Such a flux path is achieved by recessing carrier 33 opposite bridge 57 to form an air gap 58 of sufficient size to prevent flux flow through carrier 33 when a relatively lower potential is applied to coil 12. On the other hand, when a higher potential is applied to coil 12, the flux density becomes so great that the bridge 57 becomes magnetically saturated, and the flux path extends through carrier 33, around air gap 58, and through the elongated lower surface of armature 35. A ring of magnetic insulating material 59 is secured to the side surface of wall 37 to insulate the back surface of the armature 35 and prevent creation of a substantial flux path in that direction since such would retard movement of the armature toward coil 12.

The higher flux density required to draw armature 35 toward driving body 11 exceeds the flux density necessary to maintain the armature in driving position after the teeth 44 and 45 are engaged, a flux density equivalent to that used for energization of armature 27 being effective to maintain the positive driving connection. Therefore, means are provided to prevent application of the higher potential when substantial synchronism does not exist between the clutch parts and then to apply a higher potential across coil 12 only for a short length of time sufficient to bring teeth 44 and 45 into meshed relationship. This means includes a small magnetic pickup 60 which is mounted within driving body 11 and extends generally parallel to the axis of driving shaft 10 through armature 35 and wall 37, as shown in Figs. 1 and 2. The pickup has an outer, generally cylindrically shaped body 61 which contains, but is insulated from, a core 62 wrapped with a coil of wire 63, the coil being connected at one end to one of the slip rings 52 and at the other end to ground.

The exposed end 64 of core 62 is located adjacent the lower edge of the last outer disk 17 adjacent driving body 11. This disk has its inner edge notched, as at 65 (see Fig. 3), so that the flux transmitting values of the material opposite the exposed end 64 will vary when there is relative motion between the driving and driven bodies. That is, when the driving body 11 is rotating at a faster speed than the driven body or spider 13, the notches 65 and the small tang-like projections 66 between successive notches will be rotating past the exposed end of the pickup, causing an alternating current to be induced in coil 63.

A suitable electric circuit for accomplishing the desired sequenced operation of the components as described above is shown in Fig. 4, wherein lines 70 and 71 represent a suitable source of alternating current at either 110 or 220 volts potential, as desired in particular installations. A transformer 72 has its primary winding connected across lines 70 and 71, and the tapped secondary winding, including an adjustable tap switch 73, is connected as shown through a full wave rectifier 75 to provide direct current of a selected potential, for example 72 volts D.C., across the D.C. lines 78 and 80, the former of which may be gorunded if practical in a given installation, and as shown herein. The coil 12 is included in line 80 in series with its supply slip ring 51, and also in series with an adjustable resistor or potentiometer 81 which may be adjusted manually to provide a voltage drop sufficient to lower the potential across coil 12 to approximately one-half the full potential between lines 78 and 80, or for example to approximately 36 volts.

A further circuit provided by line 85 extends between the A.C. supply lines 70 and 71 and includes in series a rectifier 86 and a suitable timing control network comprising resistor 87 and condenser 88, which network has a predetermined build-up or charging time. Resistor 87 is of such high resistance as to prevent an effective flow of current through the line 85, so that the time necessary to charge condenser 88 represents essentially the total time, comparatively short, in which there will be any substantial flow of current through line 85.

A relay 90 has its operating coil connected in series with rectifier 86 and the timing control network, and the contacts 91 of this relay control a shunt or bypass circuit 92 around potentiometer 81. The relay 90 is of the type wherein the contacts are open when the relay is deenergized, and thus unless relay 90 is energized, the potential across coil 12 will be at the lower value, approximately 36 volts, whereas when the relay is energized, the shunt or bypass circuit 92 will impress the full potential, approximately 72 volts D.C., across the coil 12 to increase the flux density in the electromagnet accordingly.

A starting and stop circuit is provided by line 94, which extends between lines 70 and 71 and includes the operating coil of a further relay 95 having three separate sets of contacts 96, 96' and 96". A manually operable start switch 93, normally open, is connected to apply the A.C. potential to relay 95 when closed, and a holding or lockout circuit 97 bypasses switch 93 and includes the first set of contacts 96 for maintaining the relay 95 closed once it is momentarily energized by closing of switch 93. A normally closed manually operable stop switch 98 preferably is included in the holding circuit 97, for breaking the same to deenergize relay 95 for the purpose of shutting down the system.

The second set of contacts 96' is connected in series in line 80 to control the supply of D.C. to potentiometer 81 and bypass circuit 92, and thus there can be no potential difference at all applied across coil 12 until the starting switch 93 has been closed to energize relay 95. The third set of contacts 96" is connected in series in the circuit 85, with relay 90 and with the time delay circuit described above, and thus the relay 95 also controls the supply to relay 90.

It is necessary to delay the closing of relay 90 for some time after application of power to coil 12, otherwise the bypass circuit 92 would be closed immediately and both armatures 27 and 35 would be drawn toward driving body 11, and the positive connection afforded by teeth 44 and 45 would take place while the driving parts of the clutch were rotating at substantially greater speed than the rotational speed of the driven outer body 13. The application of an actuating potential to relay 90 is delayed for a predetermined interval by a relay 100 having contacts 101 connected in series in circuit 85, and normally closed when the relay is not energized. The relay 100 is controlled by magnetic pickup 60, the output of which is connected as shown in the drawing through slip ring 52 across a rectifier-condenser network 102 which provides voltage doubler action. The D.C. voltage obtained from this network is impressed across the operating coil of relay 100, as well as across a circuit including condenser 104 and resistor 105 which are together connected in parallel with the operating coil of relay 100.

When shaft 10 is started, magnetic pickup 60 begins to rotate, and movement thereof relative to the parts 66 on the adjacent clutch disk 17 causes a current to be produced which serves to energize relay 100 and open contacts 101, preventing completion of the operating circuit to relay 90. It should be noted that since contacts 96" are normally open, any residual charge in condenser 88 will be dissipated during down time of the system through resistor 87. Thus assuming that the starting switch has been closed to energize and lock in relay 95, and assuming that the shaft 10 is rotating through consequent actuation of the friction clutch, once the friction clutch parts bring the driving and driven members into approximate synchronism, there will be little or no relative movement between pickup 60 and the projections 66, and the pickup will no longer produce sufficient current to hold relay 100 open. The condenser 104 and resistor 105 provide a delaying action which prevents possible too rapid opening and closing movement of contacts 101.

The circuit through line 85 will thus be completed, and a sufficient current will flow during charging of condenser 88 to energize relay 90 and close contacts 91 thereof, completing the bypass circuit 92 and applying the full D.C. potential of approximately 72 volts across the magnetic coil 12. This results, as explained previously, in drawing the armature 35 toward the coil against the bias of springs 56 to engage the clutch teeth 44—45 and provide the desired positive drive connection in the clutch. The condenser 88 then becomes fully charged, and the potential across the operating coil of relay 90 drops below a value sufficient to energize that relay, with resultant opening of the bypass circuit and reduction of the potential across the magnet coil 12 to the lower or 36 volt value. This lower potential is sufficient, however, to retain armature 35 in the engaged position, and the clutch remains engaged until the circuit is broken by opening the stop switch 98, which in turn breaks the holding circuit for relay 95 and thus opens contacts 96' and 96".

As shown in Fig. 5, if desired the circuit including magnetic pickup 60, the voltage doubler and rectifier network 102, and the associated time delay condenser in resistor circuit can be replaced by an ordinary time delay control which employs a time delay clock 110 for like control to actuate relay 100 in the desired manner. Energization of the clock control 110 is accomplished by an additional set of normally open contacts 96''' which are in turn closed when relay 95 is energized.

The operation is substantially the same as described for the system of Fig. 4. Briefly, when relay 95 is energized by closing the start switch, the relay is locked in, impressing the lower potential across coil 12. Closing of contacts 96''' actuates the time delay control 110 to energize relay 100, opening contacts 101 for a predetermined interval to prevent closing of contacts 91. Subsequently, after the magnetic clutch has been engaged for a period of time predetermined as sufficient to bring the driving and driven clutch parts substantially into synchronism, the control 110 will deenergize relay 100 closing contacts 101.

Current will flow through circuit 85 until condenser 88 becomes charged, during which time relay 90 will be energized to complete the shunt circuit 92 and impress the higher potential across coil 12. Once condenser 88 becomes fully charged the current flow in circuit 85 will be insufficient to operate relay 90 and it will return to its normally open condition, opening the shunt circuit 92 and reducing the potential across coil 12 to the lower value, sufficient to hold the armature 35 in engaged position.

While the forms of apparatus herein described constitute preferred embodiments of the invention, it is to be understood that this invention is not limited to these precise forms of apparatus and that changes may be made therein without departing from the scope of the invention which is defined in the appended claims.

What is claimed is:

1. A clutch for connecting a rotating shaft to a driven device and adapted to transmit a relatively high torque, comprising a driving member adapted for connection to the rotating shaft, a driven member adapted for connection to the driven device, friction clutch means on said driving and driven members, said friction clutch means being engageable for effecting a driving connection of limited torque transmitting capability therebetween while there is relative movement therebetween to bring said driving and driven members into substantial synchronism, interengaging clutch means on said driving and driven members capable of transmitting a relatively greater torque, said interengaging clutch means including driving and driven teeth on said driving and driven members respectively, said teeth being capable of engagement with both of said members rotating constantly in the same direction and with relative movement therebetween maintained in the same direction during engagement of the clutch, electromagnetic operator means for both of said clutch means, means for sensing relative rotation between said driving and driven members, and control means responsive to said sensing means operably connected to said operator means for engaging said friction clutch means and said interengaging clutch means in that sequence whereby the engagement of said interengaging clutch means under load is delayed until relative movement between said driving and driven members has substantially ceased.

2. A clutch for connecting a rotating shaft to a driven device and adapted to transmit a relatively high torque, comprising a driving member adapted for connection to the rotating shaft, a driven member adapted for connection to the driven device, friction clutch means on said driving and driven members, said friction clutch means being engageable for effecting a driving connection of limited torque transmitting capability therebetween while there is relative movement therebetween to bring said driving and driven members into substantial synchronism, interengaging clutch means on said driving and driven members capable of transmitting a relatively greater torque, an electromagnet mounted to actuate both of said clutch means, said electromagnet being capable of creating a magnetic field sufficient to actuate said friction clutch means upon application of a relatively low potential difference thereto and being capable of engaging said interengaging clutch means only upon application of a relatively higher potential difference thereto, means operatively connected to said friction clutch means and responsive to energization of said electromagnet by a relatively low potential difference to engage said friction clutch means, means operatively connected to said interengaging clutch means and responsive only to said electromagnet upon application of a relatively higher potential difference thereto for actuating said interengaging clutch means during transmission of a substantial load by said friction clutch means, and control means operably connected to said electromagnet for applying said relatively low potential difference to said electromagnet for a predetermined interval to engage said friction clutch and bring said driving and driven member into substantial synchronism and for applying said relatively higher potential difference to said electromagnet after relative movement between said driving and driven members has substantially ceased to actuate said interengaging clutch means.

3. An electromagnetic clutch for connecting a rotating shaft to a driven device while under a substantial load and adapted to transmit a relatively high torque, comprising a driving member adapted for connection to the rotating shaft, a driven member adapted for connection to the driven device, means for sensing relative rotation between said driving and driven members, first clutch means on said driving and driven members engageable during relatively high differential rotation therebetween to bring said driving and said driven members into substantial synchronism, said first clutch means being incapable of sustained transmission of relatively high torque, second clutch means on said driving and said driven members capable of transmitting relatively greater torque, said interengaging clutch means being capable of engagement with both of said members rotating constantly in the same direction and with relative movement therebetween maintained in the same direction during engagement of the clutch, electromagnetic operator means for both of said clutch means, and control means responsive to said sensing means operably connected to said operator means for engaging said first clutch means to bring said driving and driven members into substantial synchronism and to delay engagement of said second clutch means until relative rotation between said driving and driven members has substantially ceased.

4. A clutch for connecting a rotating shaft to a driven device and adapted to transmit a relatively high torque, comprising a driving member adapted for connection to the rotating shaft, a driven member adapted for connection to the driven device, first clutch means on said driving and driven members including parts capable of effective engagement when said driving member is rotating at relatively high speed with respect to said driven member, said first clutch means being effective to accelerate said driven member, second clutch means on said driving and driven members including interengaging parts effective to couple said driving and driven members against relative movement providing a connection capable of trans- mitting relatively greater torque than said first clutch means, a first operating armature connected to said first clutch means for effecting engagement thereof, a second operating armature connected to said second clutch means for controlling engagement thereof, an electromagnet mounted in operative relation to both said armatures, means biasing said second armature in a clutch disengaging direction such that greater flux density is required to operate said second armature than to operate said first armature, and control means connected to said electromagnet for applying a first relatively low potential to said electromagnet to operate said first armature and engage said first clutch means to bring said driving and driven members into substantial synchronism, said control means being operative to apply a relatively higher potential to said electromagnet after relative movement between said driving and driven members has substantially ceased to attract said second armature and engage said second clutch means.

5. A clutch for connecting a rotating shaft to a driven device and adapted to transmit a relatively high torque, comprising a driving member adapted for connection to the rotating shaft, a driven member adapted for connection to the driven device, first clutch means on said driving and driven members including parts capable of effective engagement when said driving member is rotating at relatively high speed with respect to said driven member, said first clutch means being effective to accelerate said driven member, second clutch means on said driving and driven members including interengaging parts effective to couple said driving and driven members against relative movement providing a connection capable of transmitting relatively greater torque than said first clutch means, a first operating armature connected to said first clutch means for effecting engagement thereof, a second operating armature connected to said second clutch means for controlling engagement thereof, an electromagnet mounted in operative relation to both said armatures, means biasing said second armature in a clutch disengaging direction such that greater flux density is required to operate said second armature than to operate said first armature, control means connected to said electromagnet for applying a first relatively low potential to said electromagnet to operate said first armature and engage said first clutch means to bring said driving and driven members into substantial synchronism, said control means being operative to apply a relatively higher potential to said electromagnet after relative movement between said driving and driven members has substantially ceased to attract said second armature and engage said second clutch means, and means for reducing the potential applied to said electromagnet to said relatively lower value subsequent to engagement of said second clutch means for holding the same in engaged relation.

6. An electromagnetic clutch for forming a releasable connection between a rotating shaft and a member to be driven thereby, comprising a central driving body adapted for attachment to the shaft for rotation therewith, an electromagnet carried by said driving body, control means connected to impress selectively relatively lower and higher electrical potentials across said electromagnet to produce magnetic fields of lower and higher flux density, a driven body attachable to said driven member and positioned adjacent said driving body, means forming a releasable frictional connection between said driving and driven bodies, first armature means operable by the lower flux density to operate said frictional connection and thereby to cause gradual increase in the rotational speed of said driven body to correspond substantially with the rotational speed of said driving body, means forming a releasable positive connection between said driving and driven bodies provided for transmission of greater operating torque therebetween than with said frictional connection and including a clutch element movable with respect to said driving body between engaged and disengaged positions, and second armature means responsive to the higher flux density to move said element into engaged position joining said driving and driven bodies for operation.

7. An electromagnetic clutch for forming a releasable connection between a rotating shaft and a member to be driven thereby, comprising a driving body attachable to said shaft for rotation therewith, a driven body attachable to said driven member and positioned adjacent said driving body, a plurality of friction disks mounted alternately on said driving and driven bodies and engageable to form a frictional connection between said bodies providing for acceleration of said driven body, an electromagnet mounted on one of said bodies, control means connected to said electromagnet for selectively increasing and decreasing the potential difference applied thereto to create magnetic fields of relatively lower and higher flux density, first armature means having an operative connection with said disks and responsive to a field of the lower flux density to engage said disks, second armature means mounted on said driving body to rotate therewith and movable toward and away from said driven body in response to a field of higher flux density, and means forming a releasable positive connection between said driven body and said second armature means providing for greater torque transmission than through said frictional disk connection.

8. An electromagnetic clutch for forming a releasable connection between a rotating shaft and a member to be driven thereby, comprising a driving body attachable to said shaft for rotation therewith, a driven body attachable to said driven member and positioned adjacent said driving body, a plurality of friction disks mounted alternately on said driving and driven bodies and engageable to form a friction clutch connection between said bodies providing for acceleration of said driven body, an electromagnet mounted on said driving body, first armature means having an operative connection with said disks and responsive to a magnetic field of relatively lower flux density to engage said disks, second armature means mounted on said driving body to rotate therewith and movable relative to said driven body under control of a magnetic field of higher flux density, means normally biasing said second armature means in a direction away from said driven body to prevent actuation of said second armature means by the field of lower flux density, means forming a positive clutch connection between said driven body and said second armature means providing for greater torque transmission than through said friction clutch, control means connected to said electromagnet for selectively increasing and decreasing the potential difference applied thereto to create magnetic fields of relatively lower and higher flux density, sensing means carried by said driving body and operative to detect relative rotation between said driving body and one of said disks mounted on said driven body, and an output connection between said sensing means and said control means arranged to increase the potential difference applied to said electromagnet after said relative rotation has substantially ceased to engage said positive clutch connection.

9. An electromagnetic clutch for forming a releasable connection between a rotating shaft and a member to be driven thereby, comprising a central driving body attachable to the driving shaft for rotation therewith, a driven body attachable to the driven member and positioned adjacent said driving body, an electromagnetic carried by said driving body for producing a magnetic field, means forming a releasable frictional connection between said driving and driven bodies, means forming a releasable positive connection between said driving and driven bodies providing for transmission of greater operating torque therebetween than with said frictional connection, first and second armature means mounted on said driving body, means connecting said first armature means to control said frictional connection, means connecting said second armature means to control said positive connection and to engage said positive connection during transmission of substantial load through said frictional connection, and electrical sensing means for effecting sequenced operation of said first and second armature means to bring said driving and driven bodies into substantial synchronism before said positive connection is formed.

References Cited in the file of this patent

UNITED STATES PATENTS

| | | |
|---|---|---|
| 2,375,782 | Gilfillan | May 15, 1945 |
| 2,500,814 | Gatiss | Mar. 14, 1950 |
| 2,584,116 | Duyck | Feb. 5, 1952 |
| 2,718,951 | Mason | Sept. 27, 1955 |
| 2,788,104 | Mason | Apr. 9, 1957 |
| 2,912,088 | Breyer | Nov. 10, 1959 |